Sept. 11, 1962     R. W. EMERY     3,053,728
MOULDING APPARATUS AND METHOD

Filed Sept. 19, 1960     5 Sheets-Sheet 2

INVENTOR
ROY W. EMERY

BY Featherstonhaugh & Co.
ATTORNEYS

Sept. 11, 1962 R. W. EMERY 3,053,728
MOULDING APPARATUS AND METHOD
Filed Sept. 19, 1960 5 Sheets-Sheet 3

INVENTOR
ROY W. EMERY
BY Fetherstonhaugh & Co.
ATTORNEYS

Sept. 11, 1962  R. W. EMERY  3,053,728
MOULDING APPARATUS AND METHOD

Filed Sept. 19, 1960  5 Sheets-Sheet 5

INVENTOR
ROY W. EMERY

BY *Featherstonhaugh*
ATTORNEY

United States Patent Office 3,053,728
Patented Sept. 11, 1962

3,053,728
MOULDING APPARATUS AND METHOD
Roy W. Emery, 3409 Yonge St., Toronto 12,
Ontario, Canada
Filed Sept. 19, 1960, Ser. No. 57,073
16 Claims. (Cl. 162—228)

This invention relates to a vacuum method and apparatus for moulding long hollow articles, such as tubes, receptacles and hollow panels, from fibrous and/or other materials and is a continuation-in-part of application, Serial No. 857,625, now abandoned.

Well-known vacuum processes already exist for moulding single tubes and cones, single receptacles such as hats and flower pots, and multiple receptacles such as egg cartons and other moulded packaging trays. In these processes a single foraminous mould unit or a rigidly connected assembly of mould elements is first immersed in a vat or other enclosed area containing a fluid suspension of particles of the materials to be moulded, and a vacuum applied to one side of the foraminous part of the mould or mould assembly to cause a body of moulding materials to deposit itself on the other side of the foraminous part while the suspending fluid passes through the foraminous part by reason of the applied vacuum. When a layer of the desired thickness has been deposited, then the mould or mould assembly together with the accumulated body of moulding materials which forms the moulded article is withdrawn from the fluid suspension, and the vacuum continued until the moulded article has become sufficiently de-watered or otherwise consolidated to be removed from the mould or mould assembly.

The moulded products made by all these processes and by all prior art are characterized by a single wall thickness, and where a continuous panel is made up of a multiplicity of receptacles such as an egg carton or an apple tray, the said receptacles are shallow and/or tapered for easy removal of the mould, and the side walls of the receptacles are not laminated together, but are connected together at their ends or rims by a single layered membrane while their side wall surfaces remain otherwise separated from each other.

While this type of moulding has long been in common use, no one has yet successfully employed these methods for moulding a long tube or receptacle with side walls of more than one layer, or for moulding together a multiplicity of tubes or receptacles with one or more common walls formed by laminating their adjacent walls together.

This invention contemplates the simultaneous use of a plurality of separately located and separately movable vacuum moulds and the bringing together of these moulds after a body of moulding material has been deposited thereon in a manner to be described in detail herein whereby to laminate the adjacent side walls of the moulding materials on the several moulds to form a composite wall. The concept opens vast fields to the vacuum moulding process. By its use one can manufacture multiple tubes formed into hollow panels, and multiple receptacles formed into deep cellular containers, and single or multiple tubes with side walls laminated to a double thickness. These are new and useful products having outstanding desirable qualities that can be made at a most attractive cost with this invention.

This invention contemplates the moulding by a vacuum process of articles of the nature of a multiple tube or receptacle or a hollow panel by using two or more relatively movable core mould elements, optionally along with one or more relatively movable enclosing face mould elements, the materials to be moulded being first drawn upon the various mould elements by the same method as before but while the mould elements are still substantially spaced apart within the moulding vat or enclosure, and then drawing together into close proximity and proper register all the mould elements with the separately moulded bodies of moulding material upon them so that the adjacent sides of the bodies of moulding material are pressed and laminated together into a single moulded article while the assembly is still immersed in the suspending fluid within the moulding vat or enclosure, and with the vacuum still applied.

The assembly is then withdrawn from the vat or enclosure and the vacuum continued or alternated with or without the application of compressed air until the moulded parts are sufficiently de-watered or otherwise consolidated, following which the vacuum is discontinued and the mould elements separated from the moulded article.

The removal of the core mould or moulds may be assisted by the continued application of vacuum to the enclosing mould elements following the discontinuation of the vacuum system to the core mould or moulds, or by the application of compressed air to the vacuum side of the core moulds, or by the combination of these methods or, where these methods are unsuitable, by the use of a pervious cover of limp material on the inner rigid core mould, the inner rigid elements being first withdrawn through the limp cover, and the cover then being peeled away from the inner surfaces of the moulded article.

This invention provides for the optional introduction during the moulding or the laminating process of reinforcing materials such as metal wire or rods, and other filaments and yarns such as nylon and spun glass, either between the laminated elements or within a single layer of particles formed on one or more mould elements.

The invention will be clearly understood after reference to the following detailed specification read in conjunction with the drawings.

Figure 3:
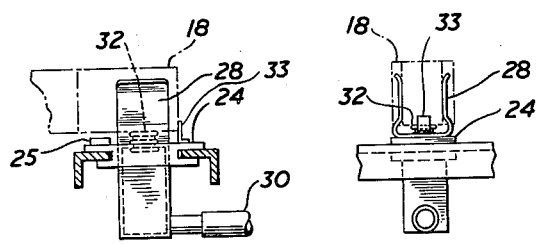

FIGURE 3 comprises views illustrating the manner in which each of the tubular core moulds is detachably connected to a vacuum hose and thence to a vacuum header.

Figure 4:
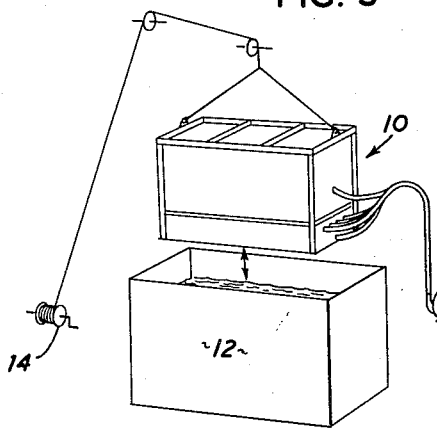

FIGURE 4 is a schematic illustration showing the means for immersing the moulds in a vat of slurry.

Figure 1:
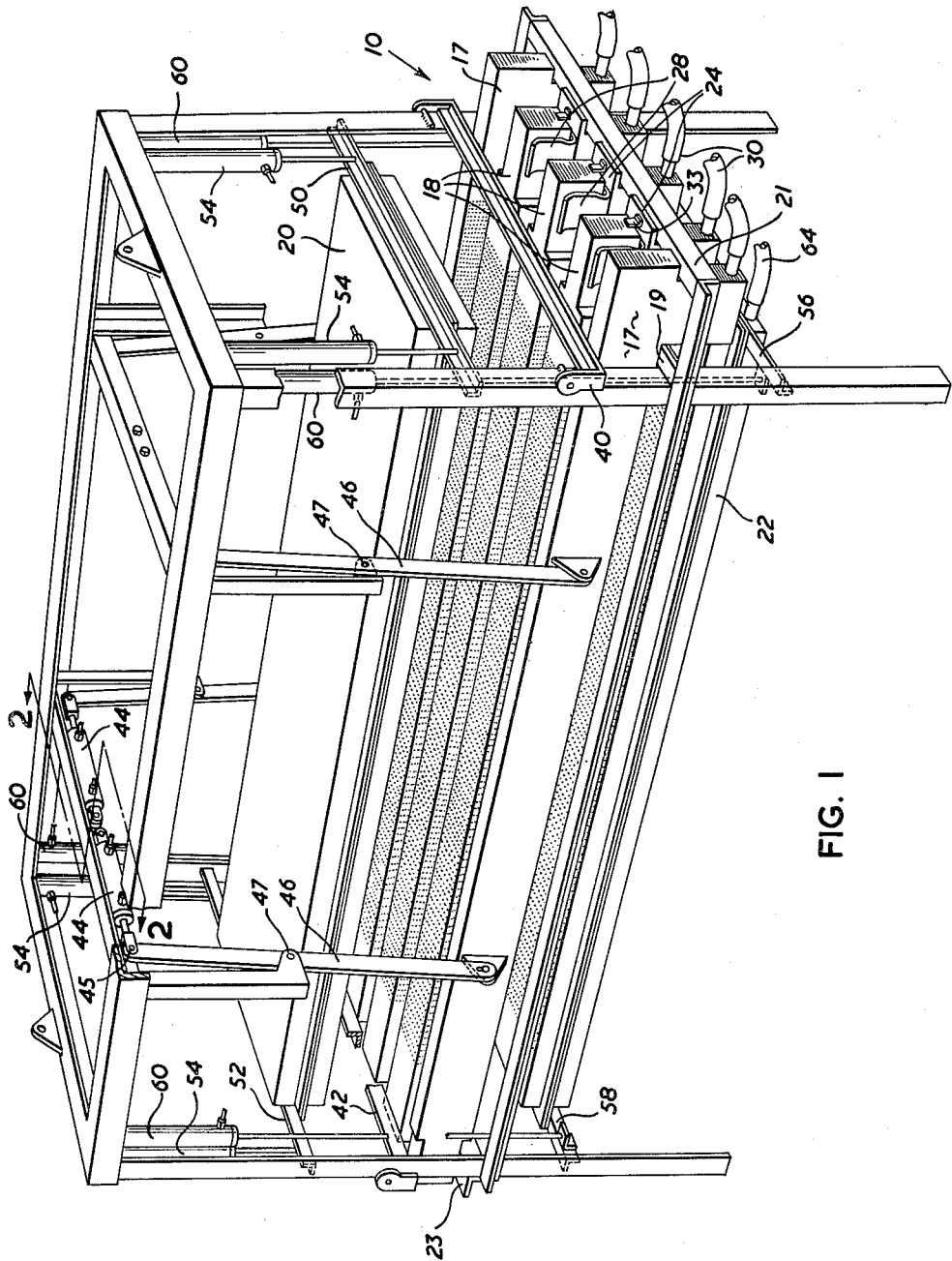
FIGURE 1 is an illustration of a plurality of moulds within their respective mounting means.
Figure 2:
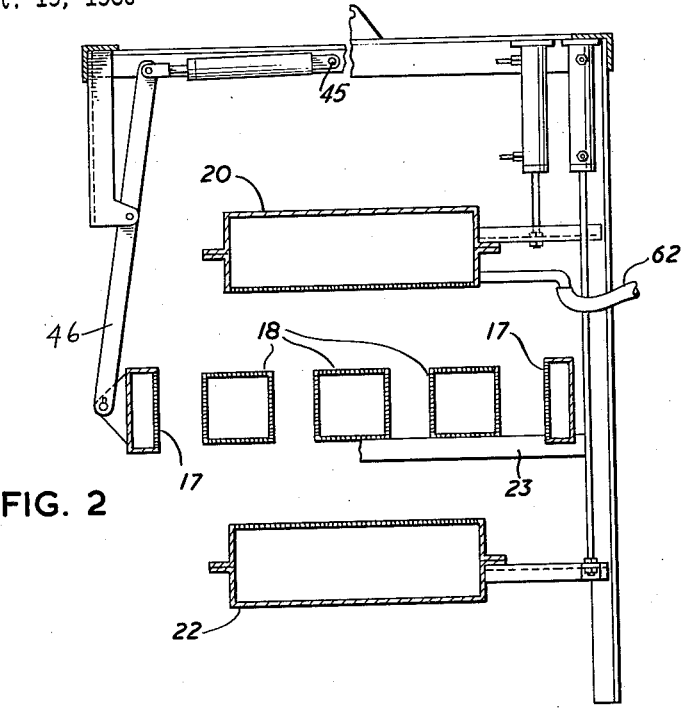
FIGURE 2 is a cross-section along the line 2—2 of FIGURE 1.
Figure 5:
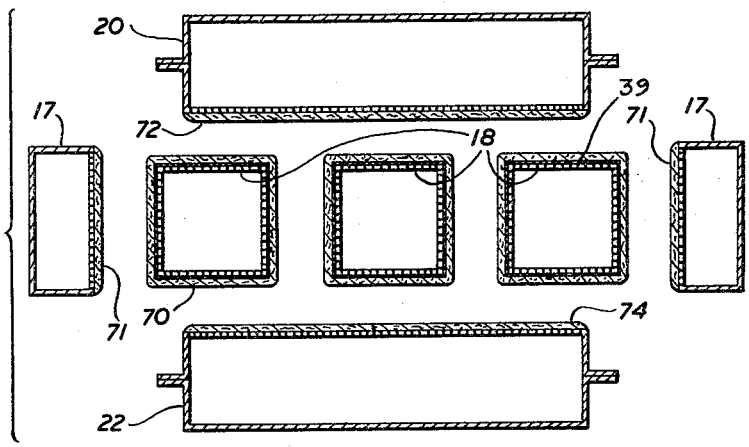

FIGURE 5 is a sectional view through the moulds of FIGURE 1 illustrating the moulds in their spaced apart relation.

Figure 6:
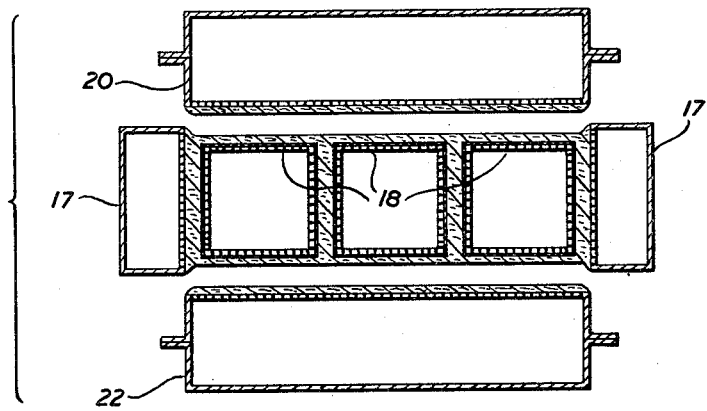

FIGURE 6 is a view similar to FIGURE 5 but showing the edge moulds and the core moulds in close proximity to each other.

Figure 7:
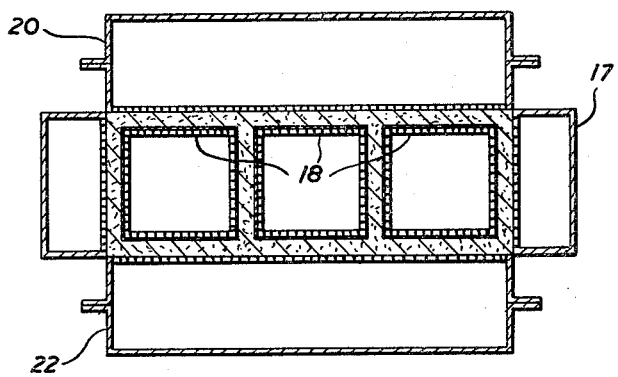

FIGURE 7 illustrates the top and bottom face moulds in close proximity to the core moulds.

Figure 8:
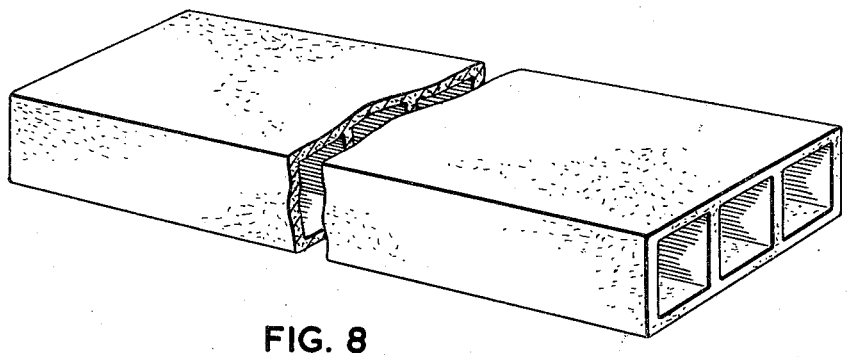

FIGURE 8 is a view of a moulded panel manufactured on the moulds of FIGURE 1.

Figure 8A:
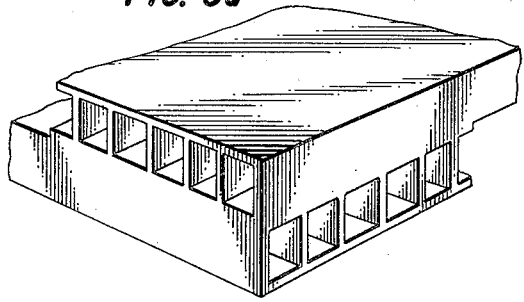

FIGURE 8(a) shows a moulded panel made up of two layers of tubes lying in parallel planes with the axes of the tubes in one layer at right angles to the axes of the tubes in the other layer, this product being suitable for use as a storage pallet.

Figure 8B:
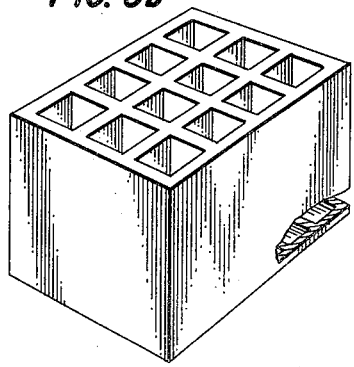

FIGURE 8(b) shows a multiple receptacle comprising 12 single receptacles laminated together in 3 rows of 4 receptacles each laminated together in a form suitable for a shipping container for bottles and the like, each individual receptacle thereof comprising a long rectangular tube with one closed end.

Figure 9:
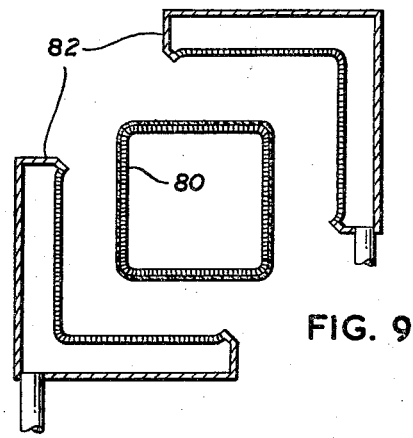

FIGURE 9 is a sectional view illustrating the form of moulds for making a tube having laminated side walls.

Figure 10:
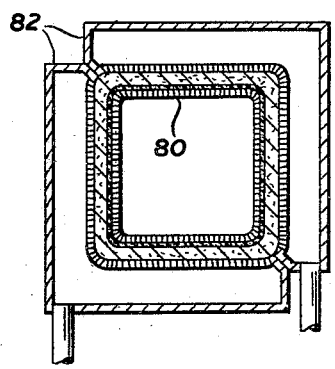

FIGURE 10 illustrates the moulds of FIGURE 9 in close proximity to each other.

Figure 11:
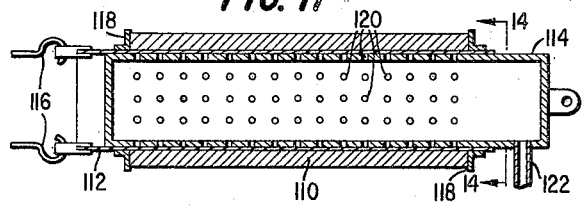

FIGURE 11 is a cross sectional view of a moulded tube formed upon a liner of a limp material that overlays a rigid tubular core mould.

Figure 12:
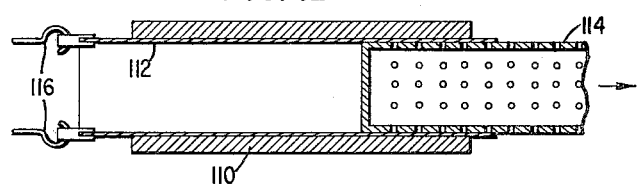

FIGURE 12 shows the rigid tubular core mould being withdrawn through the open ended liner.

Figure 13:
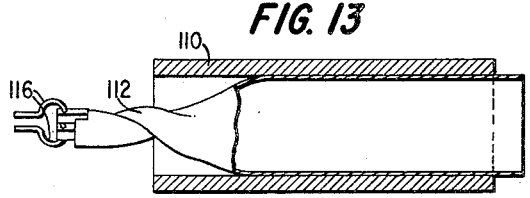

FIGURE 13 shows the moulded article with the rigid core mould removed and the liner being removed by twisting at one end.

Figure 14:
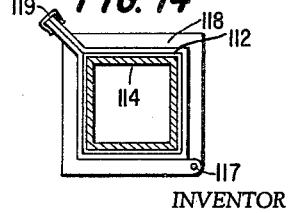

FIGURE 14 is a sectional view along the line 14—14 of FIGURE 11.

This invention, as indicated above, relates to an apparatus and a method for making hollow panels and single or multiple tubes and receptacles and the like by laminating co-extensive side walls of bodies of moulding material formed on vacuum type moulds.

In the drawings the numeral 10 generally indicates a plurality of moulds and their mounting means according to the invention. In use, by means of the hand-operated winch 14, this assembly is lowered into and raised from a vat 12 containing a slurry composed of fibrous and/or other materials suspended in a liquid.

Each of the moulds is connected to a vacuum header 16 by means of which vacuum is applied to the interior thereof to cause a body of fibrous and/or other moulding materials to deposit itself on the foraminous moulding wall surfaces thereof while the suspending fluid passes through the foraminous part by reason of the applied vacuum. The vacuum moulding process per se is well known and detailed reference to it is not intended in this specification.

The individual moulds of the assembly comprise three tubular core moulds 18, two edge face moulds 17, an upper face mould 20 and a lower face mould 22. The tubular core moulds are each detachably mounted within the frame for sliding movement with respect to the transversely extending core mould support bars 19 and 21, and 23. The vacuum ends of the core mould 18 are retained within clips 28 that are in turn carried by the slidably mounted carriages 24. A flush hole on the underside of each core mould is pressed against a compressible grommet 32 or thick gasket of rubber or similar material to form a water-tight connection between the interior of the core mould and the vacuum line 30 that extends through the carriages 24. It will be noted that the carriages 24 are free to slide between transversely extending frame members 19 and 21. A rigid stop member 25 limits the depression of the grommet 32 as the fluid tight connection is made. The opposite ends of the core moulds rest upon the transversely extending frame member 23. Stops 33 on the carriages 24 locate the core moulds longitudinally of the frame.

The edge face moulds 17 rest at one end upon the frame members 19 and 21 and at the other end upon the frame member 23, and are arranged to slide transversely along these members under the action of levers 46 pivotally mounted to the frame as at 47 and controlled in their movement by hydraulic cylinders 44. Cylinders 44 pivotally connect with the frame as at 45.

Retaining bars 40 and 42 align the top surfaces of the edge face moulds and the core moulds 18 into a horizontal plane during the moulding process. The bars 40 and 42 are hinged and can be raised to permit removal of the core moulds as will be described later.

Means are provided for moving the two edge face moulds and three core moulds 18 relatively to each other so that they can be moved from the spaced relationship in which they are illustrated in FIGURE 1 into closer proximity to each other in use. In the embodiments of the invention illustrated this means comprises the hydraulic cylinders 44 pivotally connected through levers 46 to the edge face moulds.

The upper face mould 20 is rigidly mounted on transversely extending bars 50 and 52 and is raised or lowered by the four double acting hydraulically operated cylinders 54. Lower face mould 22 is supported by transversely extending bars 56 and 58 and is raised or lowered by four hydraulically operated cylinders 60. The hydraulic control lines for the double acting cylinders 44, 54 and 60 are not illustrated because their arrangement and operation would be well known to a person skilled in the art.

It will be noted that the underside of the upper face mould 20, the upper side of the lower face mould 22, the inward facing sides of the edge face moulds, and all four sides of the core moulds 18 are foraminous so that in use a body of moulding material can be built up on the foraminous wall surfaces thereof as vacuum is applied to their interiors and the suspending fluid passes through them. Numeral 62 refers to a conduit for connecting the hollow interior of the upper face mould to a source of vacuum. Numeral 64 refers to a conduit for connecting the hollow interior of the lower face mould to a source of vacuum.

The moulding apparatus illustrated in FIGURE 1 of the drawings is adapted to mould a hollow panel such as the one illustrated in FIGURE 8 and in order to mould such a panel one would first fill the vat 12 with a fibrous or like slurry in accordance with vacuum moulding practice. The mould assembly 10 with the moulds thereof in spaced relation as illustrated in FIGURE 1 and connected to a vacuum header 16 would then be lowered into the slurry vat 12.

One would then apply vacuum to the moulds 18, 17, 20 and 22 to cause the build-up of a body of moulding material 70, 71, 72 and 74 respectively on the foraminous wall surfaces thereof.

When the body of moulding material on the core moulds 18 and the edge face moulds 17 is of predetermined thickness, the hydraulic cylinders 44 that operate the edge face moulds 17 are operated to move their respective piston rods outwardly to move the edge face moulds towards each other and force the core moulds 18 together. The foraminous wall surfaces of the edge face mould and the core moulds are thus brought into closer proximity to each other whereby to press and laminate co-extensive wall surfaces of the bodies of moulding material on the moulds to form a composite laminated wall. The moulds in this position are illustrated in FIGURE 6 of the drawings.

After the moulding materials on adjacent walls of the edge face moulds 17 and core moulds 18 have been laminated together the body of moulding material 72 and 74 on the wall surfaces of face moulds 20 and 22 respectively is laminated to the surfaces comprised of the co-planar sides of the core moulds 18 by actuating the cylinders 54 and 60 respectively to move the upper and lower face moulds into close proximity to the core moulds. The moulds are illustrated in this position in FIGURE 7.

During the laminating steps that take place in the vat as just described, vacuum must be maintained on the moulds and pressure maintained on the operating cylinders. The laminating pressure will vary with the composition of the slurry. I have found that a pressure of 5 to 10 p.s.i. on the moulded product is usually satisfactory. This must however be maintained during de-watering as aforesaid because shrinkage in thickness occurs as de-watering takes place.

After the bodies of moulding materials on the respective moulds are united the mould assembly 10 is removed from the vat of slurry 12 and vacuum on the moulds is continued to further de-water the moulding materials.

The optional application of compressed air to the interior of the core moulds at this stage will accelerate the de-watering effect, and at the same time tend to free the exterior surfaces of the core moulds from the body of the moulded product. Where the magnitude of the air pressure thus used internally in the core moulds is too great to be withstood by the hydraulic cylinders 44, 54 and 60, then a system of clamps or locks, not shown in the drawings, must be used to lock the edge moulds and face moulds together before the compressed air is applied. These clamps or locks may then be disconnected after the compressed air has been discontinued.

After partial de-watering the edge moulds 17 and the upper and lower face moulds 20 and 22 are moved away from the core moulds by operation of the cylinders 44, 54 and 60 respectively and, as they so move, they part from the body of moulding material that was formed on them.

The core moulds together with the laminated body of moulding material are then removed from the frame structure. In order to do this one raises the bars 40 and 42 on their hinges and lifts the three core moulds simultaneously from the frame. In this connection it will be recalled that connection of the core moulds to their vacuum lines was by pressure against the rubber grommets.

The body of laminated moulding material is then optionally further consolidated by the external application of pressure through a platen press or press rolls, or setting or drying in air, or by means of the further application of vacuum to the inside of the core moulds following which the said core moulds are stripped from the moulded product in staggered time sequence to avoid distortion of the moulded body due to force of removal. The separate removal of the core moulds from the body of moulded material is possible because each of the core moulds has its separate and detachable mounting means within the moulding frame.

The function of stripping the core mould from the moulded product may be facilitated by the optional use of a core mould covered with a limp liner of pervious material as shown in FIGURES 11 to 14 inclusive. In these drawings there is shown a body of moulding material 110 formed into the shape of a tube having a rectangular cross section on an open ended liner 112 of a limp material such as knitted or woven textile material that covers the side wall surface of a rigid tubular core mould 114.

The inner form 114 is withdrawn through the open ended liner 112 as the liner is retained in place within the body of moulding materials.

In use, one end of the liner 112 is retained by hooks 116 while the core mould 114 is withdrawn from the other open end thereof.

The numeral 118 refers to deckle rings which encircle the liner adjacent each of its ends to define the ends of a moulded tube. They are hinged as at 117 so that upon release of the clamps 119 they can be swung open and removed from the mould after the body of moulded materials 110 which forms the tube has been consolidated as will be evident from FIGURE 12.

After the core mould 114 has been withdrawn from the liner 112 the liner is peeled from the inside of the moulded tube 110 which as indicated above is consolidated but of course not dried. The liner must be of a limp material that has no stretch longitudinally of the core mould so that it will not break the form of the moulding material as it is peeled off. In FIGURE 13, I illustrate a suitable method for doing this in which the end of the liner retained in the hooks 116 is rotated to twist the liner 112 about its own longitudinal axis. The method of core removal described above for single tubes is equally suitable for use with multiple tubes formed into panels or other assemblies. Moreover in cases of moulding materials that are more difficult to part from moulds such as materials having a granular content one can with advantage employ a pervious limp cover on the foraminous face of the face moulds, the said limp cover being attached to the said face mould at its edges.

In FIGURE 8 I have illustrated a hollow moulded panel formed on the apparatus described in FIGURES 1 to 7.

Simple variations in the moulding process are possible to vary the characteristics of the hollow panel of FIGURE 8. For example, by increasing the time of application of vacuum to the face moulds 20 and 22 before they are brought into contact with the core moulds, the thickness of the outer walls can be increased. It is also a simple matter to insert a reinforcing wire mesh between the face mould and the surfaces formed by the core moulds with which the face moulds co-operate in order to reinforce the outer walls of the panel. The products of which the slurry is composed are also capable of great variation and range from paper wood pulp slurry to a slurry having a high content of Portland cement.

By mounting two or more layers of core moulds within the mounting means, a multi-layered panel may be formed, and the axes of the tubes in the alternating layers may be parallel to each other or at right angles as illustrated in FIGURE 8(a). Also, when the core mould is rigidly mounted at one end to the carriage, the said mould may then be made foraminous at the opposite end to form a tube with one closed end suitable for a receptacle. In FIGURE 8(b) I show a moulded product in which a number of such receptacles have been formed separately as before and then brought together and laminated to form a multiple receptacle or container.

In many instances it may be desirable to omit the use of the edge face moulds 17 or the upper and lower face moulds 20 and 22 or all of them, thus leaving some or all of the external side walls of a single thickness. Where the edge moulds 17 are omitted, then it is necessary to provide means for actuating the core moulds towards each other.

In FIGURE 9, I illustrate the form of moulds for making a long tube having laminated side walls. In this case one would have an elongated tubular core mould 80 and a pair of face moulds 82 each having foraminous wall surfaces at right angles to each other.

In use the face moulds 82 would be actuated towards the core moulds 80 to enclose it as indicated in FIGURE 10 whereby to laminate the bodies of moulding materials built up on the core mould and the face moulds. It will be appreciated that the rectangular cross section of the tube moulds shown in FIGURES 9 and 10 could be round or any other appropriate shape. Similarly the moulds for the multiple tube panel can be modified to make a panel having voids other than rectangular in cross section. They could be circular in cross section for example in which case the outer surface would be corrugated in appearance.

What I claim as my invention is:

1. Apparatus for making moulded articles having long tubular voids comprising a plurality of long tubular core moulds having side wall moulding surfaces on which moulding material may be deposited by suction, a moulding frame, a plurality of mounting means, one for each of said moulds, each for detachably mounting its respective mould in said frame in spaced relation to another mould, and mould actuating means for actuating said moulds while they are mounted in said mounting means from a normal position, in which moulding material can be deposited on moulding surfaces thereof, to an integrating position in which moulding surfaces thereof are in closer spaced relation than in said normal position to integrate moulding materials deposited on moulding surfaces.

2. Apparatus for making moulded articles as claimed in claim 1 in which said mounting means for said moulds each supports its respective mould with its longitudinal axis in a substantially horizontal position.

3. Apparatus for moulding articles as claimed in claim 1 having a vat within which said moulding materials can be suspended in a liquid and means for actuating said frame into and out of said vat.

4. Moulding apparatus as claimed in claim 2 having a vat within which moulding materials can be suspended in a liquid and means for actuating said frame into and out of said vat.

5. Apparatus for making moulded articles as claimed in claim 1 in which said mounting means for said moulds each supports its respective mould with its longitudinal axis in parallel relation to and in a common plane with the longitudinal axis of each of the other moulds when in said integrating position whereby moulding materials deposited on said moulds and integrated is formed into a panel with tubular voids.

6. Apparatus for making moulded articles as claimed in claim 1 in which said mounting means for said core moulds detachably mount their respective core moulds as aforesaid adjacent each of their ends.

7. Apparatus for making moulded articles as claimed in claim 1 in which said mounting means for said core moulds detachably mount their respective core moulds as aforesaid adjacent each of their ends.

8. A method of moulding a product having long tubular voids comprising the steps of taking a plurality of long tubular core moulds of the vacuum type, forming a body of moulding material on each of said core moulds by the vacuum process, integrating the body of moulding material on each of said core moulds to the body of moulding material on at least one other of said core moulds to form a composite moulded body by bringing and maintaining the core moulds into close proximity to each other while the vacuum is still applied to the moulds and while the moulds are still in the presence of fluid suspended moulding materials and removing said core moulds from said composite moulded body after consolidation thereof in staggered time relation.

9. Apparatus for making moulded articles having long tubular voids comprising a core mould on which moulding material may be deposited on the side walls by suction, a frame, means for detachably mounting said core mould in said frame, a face mould having a moulding surface upon which moulding material may be deposited by suction, said moulding surface of said face mould being complementary to a portion of the outer side wall of said tubular core mould, means for mounting said face mould in said frame, actuating means for actuating said core mould and said face mould with respect to each other while they are mounted in said frame from a moulding position, in which moulded material may be deposited on the moulding surfaces of each of said moulds, to an integrating position in which the moulding surfaces thereof are in closer spaced relation than in said moulding position to integrate moulding materials deposited on said core mould.

10. Apparatus for making moulded articles as claimed in claim 9 comprising one tubular core mould and a plurality of face moulds, the moulding surfaces of said face moulds being adapted to enclose the side wall of said core mould when actuated to said integrating position.

11. Apparatus as claimed in claim 10 in which the longitudinal axis of said core mould is substantially horizontal when mounted in said frame.

12. Apparatus for making moulded articles having long tubular voids comprising a plurality of core moulds on which moulding material may be deposited on the side walls by suction, a frame, means for detachably mounting said core moulds in said frame, at least one face mould having a moulding surface upon which moulding material may be deposited by suction, means for mounting said face mould in said frame, means for actuating said core moulds with respect to each other while they are mounted in said frame from a moulding position, in which moulded material may be deposited on the moulding surfaces thereof, to an integrating position, in which the moulding surfaces thereof are in closer spaced relation than in the moulding position, to integrate moulding material deposited on the core moulds into a body having at least one composite outer surface, said moulding surface of said face mould being complementary to a composite outer surface of a moulded body formed by said core moulds and integrated as aforesaid in use, actuating means for actuating said face mould with respect to said core moulds from a normal position in which it is spaced substantially from said core moulds and in which moulding material may be deposited thereon to an integrating position, in which the moulding surfaces thereof are in closer spaced relation to the moulding surfaces of said core moulds when they are in an integrating position to integrate moulding material on the face moulds formed into a composite surface with moulding material deposited on the face mould, said means for actuating said core moulds and for actuating said face mould being operable in time sequence.

13. Apparatus as claimed in claim 12 having a plurality of face moulds, said core moulds being arranged so that when they are moved to said integrating position they form a moulded article having a plurality of composite surfaces, each of said face moulds being adapted to integrate the moulding material formed thereon in use as aforesaid on one of said composite surfaces formable by said core moulds in use.

14. Apparatus for making moulding articles as claimed in claim 12 in which the longitudinal axis of said core moulds is substantially in a horizontal position when mounted in said frame.

15. Apparatus for making moulding articles as claimed in claim 13 in which the axis of said core moulds when mounted in said frame is substantially horizontal.

16. Apparatus as claimed in claim 14 in which said face moulds have moulding surfaces that enclose said core moulds when said core moulds and said face moulds are each moved to their said integrating positions.

References Cited in the file of this patent
UNITED STATES PATENTS

| | | |
|---|---|---|
| 1,690,528 | Bushnell | Nov. 6, 1928 |
| 2,445,290 | Gonda | July 13, 1948 |